(12) United States Patent
Joss

(10) Patent No.: US 6,309,317 B1
(45) Date of Patent: Oct. 30, 2001

(54) CENTRIFUGAL CLUTCH SHIFTER

(76) Inventor: Robert Joss, P.O. Box 38, Holman, Northwest Territories (CA), X0E 0S0

( * ) Notice: Subject to any disclaimer, the term of this patent is extended or adjusted under 35 U.S.C. 154(b) by 0 days.

(21) Appl. No.: 09/236,125

(22) Filed: Jan. 22, 1999

(30) Foreign Application Priority Data

Jan. 28, 1998 (CA) .................................................. 2228088

(51) Int. Cl.$^7$ ............................. F16H 63/00; F16H 59/36
(52) U.S. Cl. ................................. 474/13; 474/14; 474/16
(58) Field of Search .................................... 474/8–16, 69, 474/70; 192/3.31, 105 C, 105 CD

(56) References Cited

U.S. PATENT DOCUMENTS

| | | |
|---|---|---|
| 771,771 | 10/1904 | Dysterud . |
| 2,647,604 | 8/1953 | Carmichael . |

(List continued on next page.)

FOREIGN PATENT DOCUMENTS

| | | |
|---|---|---|
| 913414 | 10/1972 | (CA) . |
| 913415 | 10/1972 | (CA) . |
| 2170970 | 11/1996 | (CA) . |
| 250983 | 7/1948 | (CH) . |
| 85 03800 | 9/1986 | (FR) . |

OTHER PUBLICATIONS

Internet material pertaining to Thunder Shift kit, located at *http://www.cloudnet.com˜tpi/tskrrl.htm*, downloaded Oct. 22, 1997.

Internet article entitled "Why more spring and more weight?". located at *http://muller.net/karting/docs/technical/clutch1.html*, downloaded Oct. 22, 1997.

Primary Examiner—Thomas R. Hannon
Assistant Examiner—Marcus Charles
(74) Attorney, Agent, or Firm—Haugen Law Firm PLLP

(57) ABSTRACT

A device for use in a centrifugal clutch assembly in which the clutch assembly comprises a shaft which carries a first sheave axially moveable on the shaft and a second sheave axially fixed on the shaft, a drive belt between the first sheave and the second sheave and a return spring operating on the first sheave. A roller is fixed relative to the first sheave and a pivot pin is fixed on and moveable with the first sheave. The device further comprises a body having an arcuate outer surface constructed so as to provide a cam surface relative to the roller. An aperture is provided in the body and is constructed so as to mate with the pivot pin to allow the device to pivot relative to the pivot pin. A hollow chamber is positioned internally within the body and moveable weighting means are positioned within the chamber. In use, the first sheave rotates at a variable speed, so as to generate a centrifugal force upon the device whereupon at a predetermined engagement speed, the device pivots from a rest position to a full engagement position thereby transferring a force to the first sheave to axially move the first sheave into engagement with the second sheave to transfer rotation from the drive clutch to the secondary clutch.

18 Claims, 5 Drawing Sheets

U.S. PATENT DOCUMENTS

| | | |
|---|---|---|
| 3,024,886 | 3/1962 | Peras . |
| 3,048,056 | 8/1962 | Wolfram . |
| 3,084,775 | 4/1963 | Magnavita . |
| 3,165,184 | 1/1965 | Hebert . |
| 3,283,867 | 11/1966 | Rice . |
| 3,562,224 | 2/1971 | Argereu . |
| 3,675,731 | 7/1972 | Stopera . |
| 3,939,720 | 2/1976 | Aaen et al. . |
| 3,971,263 * | 7/1976 | Beaudoin et al. ............... 474/14 |
| 4,195,721 | 4/1980 | Shea . |
| 4,313,728 * | 2/1982 | Prasad .................... 192/105 CD |
| 4,328,884 | 5/1982 | Meldahl et al. . |
| 4,336,870 | 6/1982 | Shea . |
| 4,483,686 * | 11/1984 | Kobayashi et al. ............ 474/14 X |
| 5,121,822 | 6/1992 | Edlund . |
| 5,172,786 | 12/1992 | Ishibashi . |
| 5,280,828 * | 1/1994 | Reynoso et al. ............. 192/105 CD |
| 5,326,330 | 7/1994 | Bostelmann . |
| 5,328,413 | 7/1994 | Robert . |
| 5,358,450 | 10/1994 | Robert . |
| 5,421,784 | 6/1995 | Robert . |
| 5,458,539 | 10/1995 | Landry . |
| 5,516,332 | 5/1996 | Robert . |
| 5,562,555 | 10/1996 | Peterson . |
| 5,597,060 * | 1/1997 | Huddleston et al. ............ 192/105 C |
| 5,692,982 | 12/1997 | Peterson . |
| 5,795,255 | 8/1998 | Hooper . |

* cited by examiner

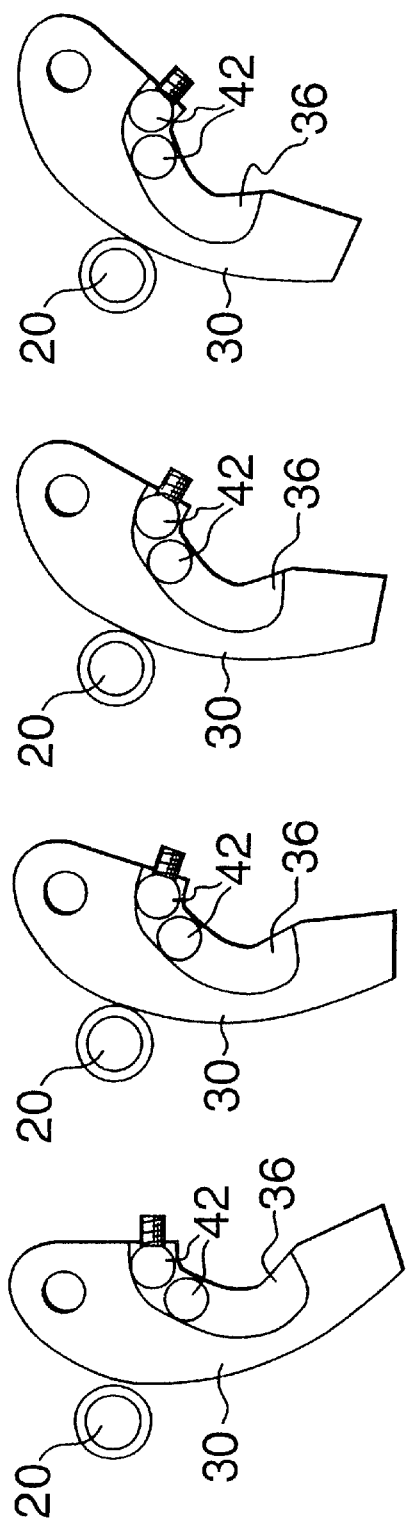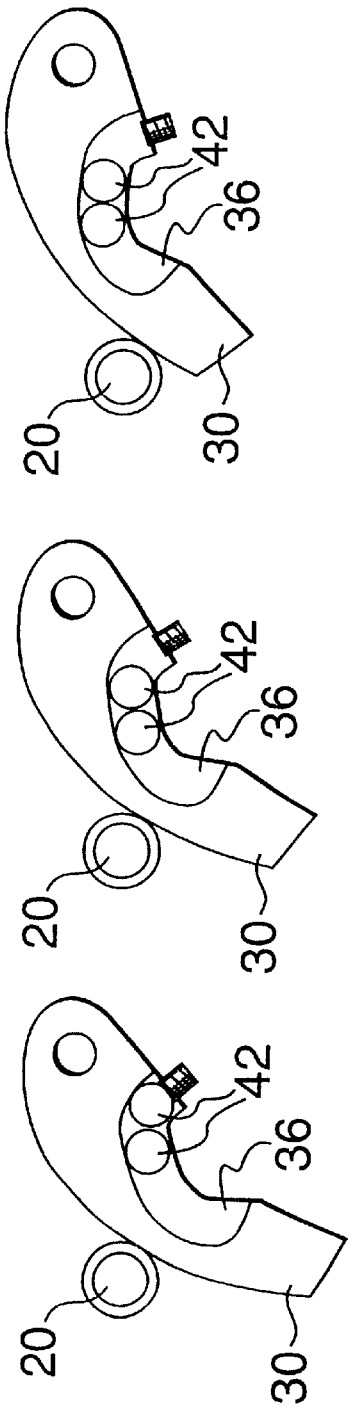

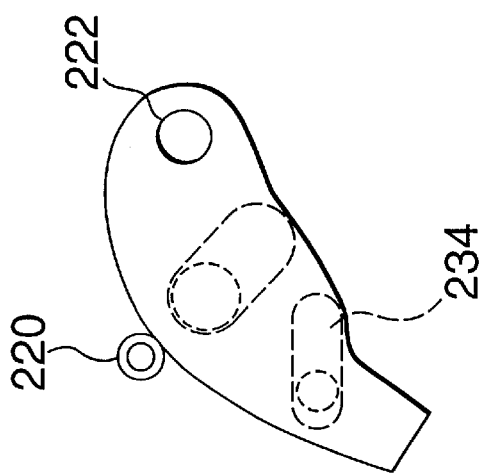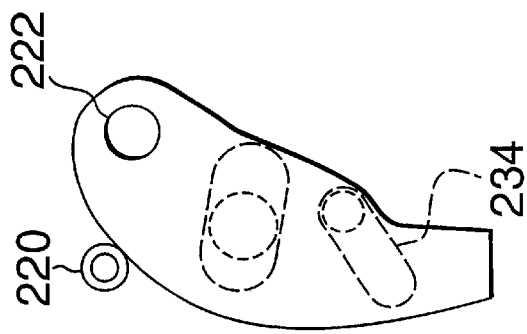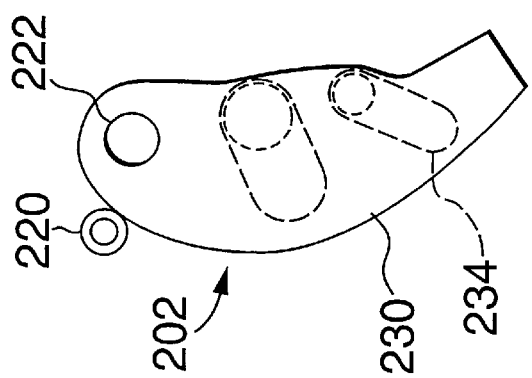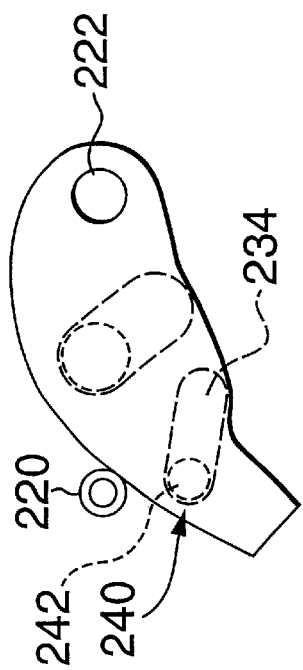

CENTRIFUGAL CLUTCH SHIFTER

FIELD OF THE INVENTION

This invention relates to a device for use in a clutch assembly as a centrifugal clutch shifter.

BACKGROUND OF THE INVENTION

High performance engines require quick response times. The drive transmissions must shift speeds quickly to provide optimum performance. This is particularly true in racing situations, for example in snowmobile racing.

The infinitely variable drive pulley for belt drive transmissions commonly found in snowmobile engines is well known. A key part of the clutch system in those transmissions is the actuator lever or shifter which operates as a cam relative to a fixed roller by pivoting about a pivot point on an axially moveable sheave so that in response to centrifugal force the axially moveable sheave of the system is urged towards a axially fixed sheave to thereby transfer rotation to the axially fixed sheave.

Particularly in race conditions, fast clutching and de-clutching is imperative. Therefore, faster response clutches are constantly being pursued. However, the clutches currently being used do not clutch and de-clutch fast enough to provide the racer with optimum performance from the engine. It is believed that these clutches lack the proper weight distribution below the pivot point to provide peak performance throughout the shift.

Attempts to improve clutch performance in the prior art have largely focused on the engagement point of the actuator. For example, U.S. Pat. No. 5,326,330 of Bostelmann, issued Jul. 5, 1994, describes an infinitely variable drive pulley for a belt drive transmission which uses an adjustment eccentric on the adjusting lever of the assembly to adjust the centre of gravity of the lever relative to the pivot pin and the initial position of the cam surface relative to the follower when in the rest or neutral position. This, in theory, varies the engagement speed of the clutch. However, once the clutch is engaged, the weight distribution of the lever does not change as the pulley moves from the rest or neutral position through the shift to the full shift position. Therefore, clutch performance and engine performance are ultimately compromised.

Other attempts at using specialized actuators have been directed toward different clutch assemblies or transmission systems and would therefore not function in the infinitely variable drive pulley system. Reference may be had, for example, to U.S. Pat. No. 771,771 of Dysterud, issued Oct. 4, 1904 and U.S. Pat. No. 2,647,604 of Carmichael, issued Aug. 4, 1953.

There therefore exists a need for a clutch actuator which operates at higher engagement speeds and which allows for weight distribution within the shift.

SUMMARY OF THE INVENTION

It is an object of the present invention to provide an improved device for use in a clutch assembly as a centrifugal clutch shifter.

In one aspect of the invention, there is provided a device for use in a centrifugal clutch assembly in which the clutch assembly comprises a shaft which carries a first sheave axially moveable on the shaft and a second sheave axially fixed on the shaft, a drive belt between the first sheave and the second sheave and a return spring operating on the first sheave. A roller is fixed relative to the first sheave and a pivot pin is fixed on and moveable with the first sheave. The device further comprises a body having an arcuate outer surface constructed so as to provide a cam surface relative to the roller. An aperture is provided in the body and is constructed so as to mate with the pivot pin to allow the device to pivot relative to the pivot pin. A hollow chamber is positioned internally within the body and moveable weighting means are positioned within the chamber. In use, the first sheave rotates at a variable speed, so as to generate a centrifugal force upon the device whereupon at a predetermined engagement speed, the device pivots from a rest position to a full engagement position thereby transferring a force to the first sheave to axially move the first sheave into engagement with the second sheave to transfer rotation from the drive clutch to the secondary clutch.

In another aspect of the invention, there is further provided an adjustment means for adjusting the weighting means within the chamber when the device is in the rest position so as to adjust the engagement speed.

In another aspect of the invention, the weighting means comprises at least one generally spherical member.

In another aspect of the invention, the weighting means comprises fluid filling up to half of the chamber by volume.

BRIEF DESCRIPTION OF THE DRAWINGS

These and other advantages of the invention will become apparent upon reading the following detailed description and upon referring to the drawings in which:

FIGS. 5a to 5g is a series of side plan views of an embodiment of the shifter in accordance with the present invention, in various stages of operation.

FIGS. 7a to 7d is a series of side plan views of another alternate embodiment of the shifter in accordance with the present invention, in various stages of operation.

Figure 1:
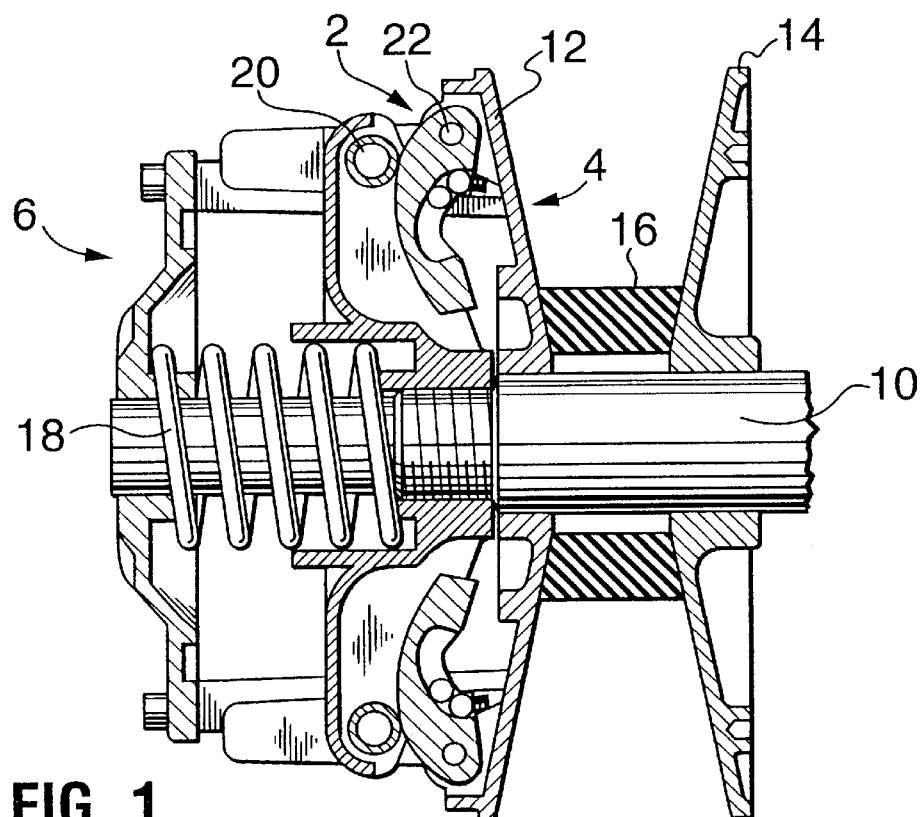
FIG. 1 is a schematic side view, partially in section, of a drive pulley for a belt drive transmission incorporating the device of the present invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to the drawings, FIG. 1 illustrates a device 2 for use in a centrifugal clutch assembly 4 within a infinitely variable drive pulley for a belt drive transmission 6. The assembly 4 comprises a shaft 10 which carries an axially moveable sheave 12 and an axially fixed sheave 14 which is only free to rotate with the shaft 10. The drive belt 16 and return spring 18 also form part of a standard transmission 6. There is also provided a roller 20 fixed relative to the sheave 12 and a pivot pin 22 fixed on and moveable with the sheave 12.

The device 2 comprises a body 30 which has a mass $M_B$. The body 30 is typically made out of metal, or the like, and is preferably generally crescent shaped with an arcuate outer surface 32 which has been provided with a smooth finish by machining, for example, to form a cam surface. An aperture 33 is constructed so as to cooperate with the pivot pin 22 to allow the device 2 to pivot.

Figure 3:
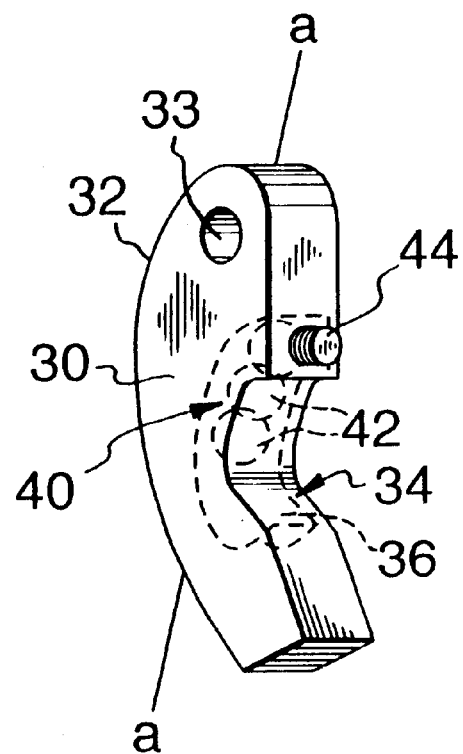
FIG. 3 is a perspective view of an embodiment of the centrifugal clutch shifter in accordance with the present invention.
Figure 4:
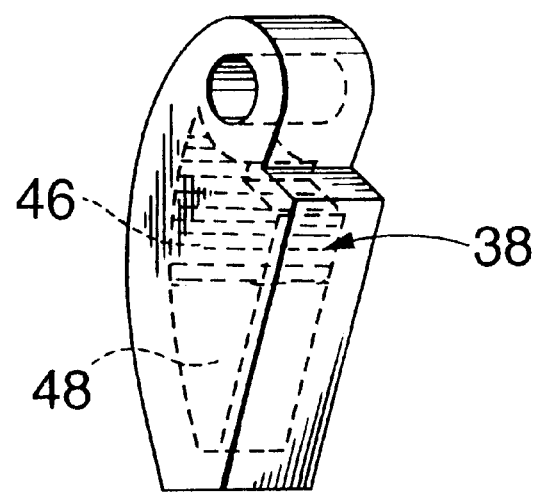
FIG. 4 is a perspective view of another embodiment of the centrifugal clutch shifter in accordance with the present invention.
Figure 6D:
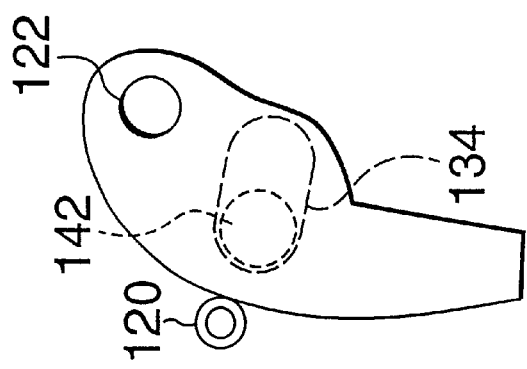
FIGS. 6a to 6d is a series of side plan views of an alternate embodiment of the shifter in accordance with the present invention, in various stages of operation.
Figure 6C:
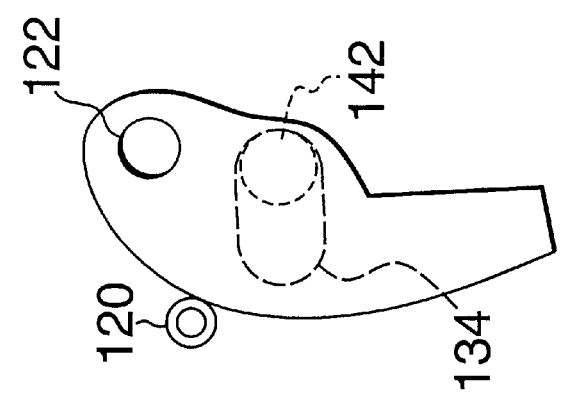
Figure 6B:
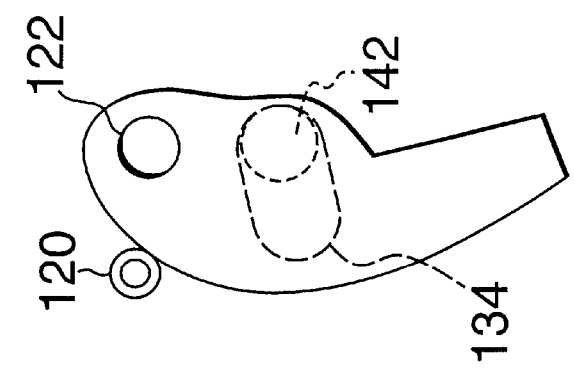
Figure 6A:
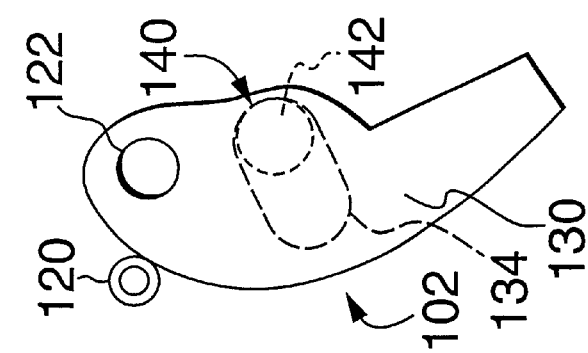

There is a hollow chamber 34 internally within the body 30 that may be in the form of a channel 36 as shown in FIG. 3 or a pocket 38 as shown in FIG. 4. The chamber 34 is constructed so as to house a weighting means 40 moveable within the chamber 34. In the embodiment shown in FIG. 3 in which the channel 36 is employed, the weighting means 40 comprises a number of individual counterweights, shown as metal balls 42. Rollers (not shown) may also be used. Each of the metal balls 42 has a mass $M_{CW}$. Typically, two to three balls 42 will be employed although those skilled in the art will appreciate that as few as one and as many as five balls could be used. In each case, the mass $M_{CW}$ would be adjusted to compensate for the increase or decrease in the number of counterweights.

In this embodiment, there may also be provided a means of adjusting the position of the balls 42 within the channel 36 at the rest position, such as a set screw 44 which can be turned in to move the balls 42 to a position such that the top ball is vertically aligned with the pivot pin 22.

Figure 2:
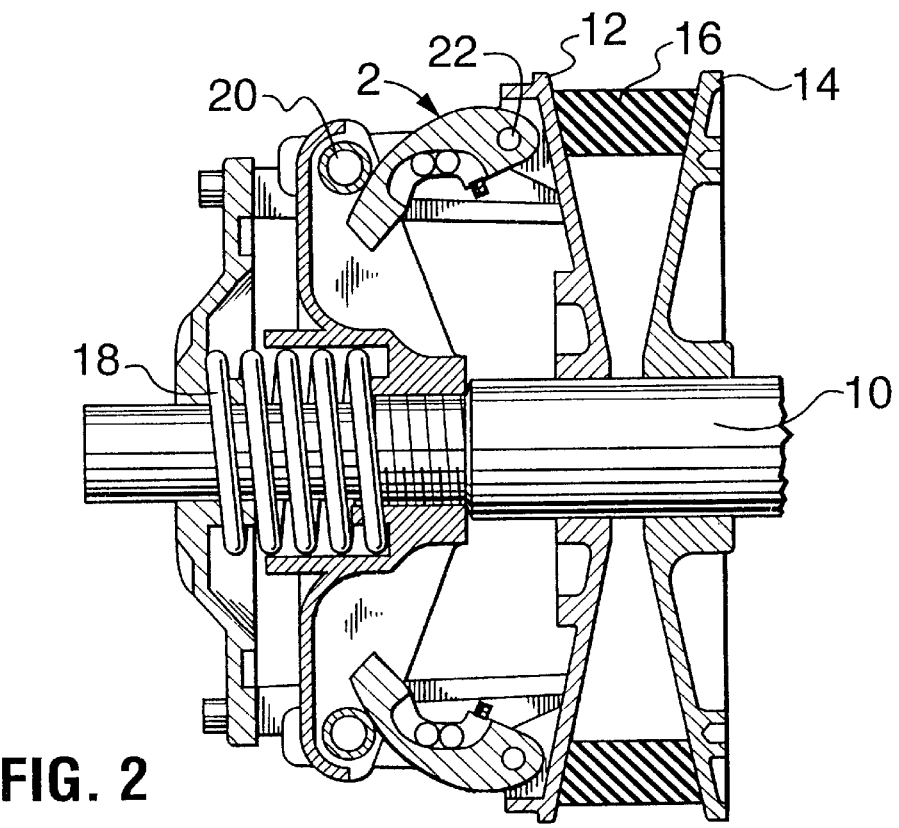
FIG. 2 is a schematic side view, partially in section, of the drive pulley of FIG. 1 in engagement position.

In use, the sheave 12 rotates at a variable speed thereby generating a centrifugal force on the device 2. At a predetermined speed, termed the engagement speed $S_E$, the device 2 will begin to move from its neutral or rest position shown in FIG. 1 to a full shift position shown in FIG. 2. The engagement speed is preferably in the range of 4,000 to 6,000 rpm and more preferably greater than 5,000 rpm. In doing so, the roller 20 rolls along the cam surface 32 and the device 2 operates axially on the sheave 12, against the force of the return spring 18, in the direction of the sheave 14 in order to transfer the rotational movement of the sheave 12 to the sheave 14.

The series of drawings in FIGS. 5a to 5g illustrate the device 2 moving through its range of motion from neutral to full shift. In those drawings, it can be seen how the weighting means 40 moves within the channel 36 to distribute the weight differently throughout the shift which will have the effect of increasing the leverage against the return spring. This provides optimum performance for the clutch as follows.

In the neutral position, the weighting means 40 works to decrease the overall mass of the device 2, thereby increasing the engagement speed $S_E$ at which the clutch will engage. This is achieved by playing the weighting means 40 to the top of the channel 36 to counteract the centrifugal force applied to the device 2. In general terms, it is desired to have a higher overall mass $M_D$ of the device, to increase the shifting speed. The mass $M_D$ is the sum of $M_B$ and $M_{CW}$. However, if the overall mass $M_D$ of the device 2 is too high, the engine shift speed will be detrimentally effected, thereby taking the engine below its maximum horsepower. If the overall mass $M_D$ is too low, the engine will have a tendency to "over rev" above its maximum horsepower rpm. Therefore, it is necessary to tune the clutch to keep the engine at its maximum horsepower. This is done, in part by adjusting the mass $M_B$ relative to the mass $M_{CW}$.

Generally, to increase $S_E$, heavier weighting means 40 are used, thereby increasing $M_{CW}$, for example from two balls 42 at approximately 2 to 4 grams each to three balls 42 at 2 to 4 grams each. To compensate, so as to maintain peak performance, the mass of the body $M_B$ can be decreased by a little more than the total weight of the weighting means 40, for example bringing the mass $M_D$ down from about 50 grams to about 45 to 48 grams. However, the increased weight of the weighting means 40 by virtue of the increased number of counterweights allows the weight of the device 2 to be distributed throughout the shift, thereby placing the weight within the device 2 where it is needed most at each point in the shift to improve the clutching and to improve the de-clutching response time.

As best seen in the series of drawings in FIGS. 5a to 5g, the counterweights will move internally in the chamber 34 in the device 2 from the neutral position at the top and front of the chamber 34 towards the middle of the chamber 34 as the device pivots through to half shift and towards the end of the chamber 34 as the device continues to pivot through to the full shift position. By allowing the weighting means 40 to move within the chamber 34, the weighting means 40 will assist the device 2 by altering the weight distribution so that there is more weight in the front at the start, more weight in the middle at mid-shift and more weight towards the rear at full shift.

Another means of adjusting the engagement speed $S_E$ is to adjust the positioning of the counterweights in the neutral position. To increase $S_E$, the adjustment means 44 is moved inward to move the top ball 42 in a position under the pivot 22 and therefore in line with the counterweight ramp angle, designated by line a—a. This increased mass on the counterweight ramp angle has the net effect of increasing the overall effective weight of the counterweights and thereby increasing $S_E$. Moving the top ball 42 off of the line a—a has the effect of neutralizing its mass at the rest position thereby decreasing the engagement speed. The skilled person in the art will appreciate that the weight of that top ball will still play an active roll in the weight distribution within the device 2 during the shift.

FIGS. 6a to 6d illustrate an alternate embodiment of the device 102 of the present invention in which the hollow chamber 134 within the body 130 extends transversely across the body 130. The weighting means 140, metal ball 142, moves within chamber 134 as the device 102 moves through its range of motion from neutral to full shift. In this embodiment, the distance between the pivot point 122 and the weighting means 140 is increased, thereby in turn tending to maximizing the force applied by the device 102 against the roller 120. The result is improved timing and overall operation of the device 102.

Similarly in FIGS. 7a to 7d, a further alternate embodiment is shown in which a second chamber 234 is added to the body 230 in order to house a second counterweight 240, again shown in the form of metal ball 242. Once again, with the increased distance between the weighting means 240 and the pivot point 222, this time also with increased mass of the weighting means 240, the force exerted by the device 202, on the roller 220 is increased.

Either of the embodiments of the device shown in FIGS. 6a to 6d or 7a to 7d may be provided with a set screw (not shown) as an adjustment means in the same manner as shown in FIG. 3.

In the embodiment of the device 2 shown in FIG. 4, in which the chamber 34 is in the form of the pocket 38, the weighting means 40 is a liquid 46 which fills the pocket 38 up to about half, by volume, so that the liquid 46 will have a mass $M_F$. The remaining space 48 within the pocket 38 may be left as air space or may be filled with an inert gas.

Thus, it is apparent that there has been provided in accordance with the invention a device for use in a clutch assembly as a centrifugal clutch shifter that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The embodiments of the invention in which an exclusive property or privilege is claimed are defined as follows:

1. A centrifugal clutch assembly and a device for use in combination with an engine, said clutch assembly comprising a shaft which carries a first sheave axially moveable on said shaft, a second sheave axially fixed on said shaft, a drive belt between said first sheave and said second sheave, a return spring operating on said axially moveable sheave, a roller fixed relative to said second sheave and a pivot pin fixed on and moveable with said first sheave; said device comprising:

an elongated body pivotally coupled to said pivot pin and having first and second opposed ends and with an arcuate outer edge camming surface in contact with said roller so as to provide a camming motion to move said elongated body laterally relative to said roller;

an aperture formed within said elongated body and disposed adjacent said first end thereof and constructed so as to mate with said pivot pin to allow said elongated body to pivot relative to said pivot pin for creation of said camming motion, the point of contact between said camming surface and said roller being determined by centrifugal forces operating on said elongated body and said pivot pin;

a closed hollow chamber formed within and positioned internally of said elongated body with said hollow chamber having a chamber axis extending between said first and second opposed ends; and weighting means within said chamber and freely moveable reciprocably therein in response to centrifugal force from rotation of said shaft, wherein the relative position of the weighting means defines a counterweight ramp axis and with a counterweight ramp angle being the angle defined between the counterweight ramp axis and the direction of the centrifugal force, whereby in use, the movement of the weighting means within said chamber alters the effective mass on the counterweight ramp angle, thus altering overall effective weight of the weighting means, so as to optimize positioning of said weighting means relative to said centrifugal force to controllably alter the centrifugal force effecting said elongated body, the arrangement being such that said camming contact point and said sheave positions are maintained so that engine speed is maintained substantially at its maximum power output.

2. The device of claim 1 further comprising adjustment means for adjusting a first orientation of said weighting means within said hollow chamber when said device is in a rest position so as to adjust a predetermined engagement speed of said clutch assembly through pivotal positioning of said elongated body.

3. The device of claim 1 wherein said weighting means comprises at least one generally spherical member.

4. The device of claim 1 wherein said weighting means comprises fluid filling up to half of said chamber by volume.

5. The device of claim 2 wherein said weighting means comprised at least one generally spherical member.

6. The device of claim 2 wherein said adjustment means comprises a set screw pushing on said weighting means.

7. The device of claim 3 wherein said weighting means comprises two of said generally spherical members.

8. The device of claim 3 wherein said generally spherical member comprises a metal ball.

9. The device of claim 3 wherein said generally spherical member has a mass in the range of 2 grams to 4 grams.

10. The device of claim 4 wherein said fluid is chosen from the group consisting of oil or mercury.

11. The device of claim 5 wherein said weighting means comprises two of said generally spherical members.

12. The device of claim 5 wherein said generally spherical member comprises a metal ball.

13. The device of claim 5 wherein said generally spherical member has a mass in the range of 2 grams to 4 grams.

14. A centrifugal clutch assembly and a device for use in combination with an engine, said clutch assembly comprising a shaft which carries a first sheave axially moveable on said shaft, a second sheave axially fixed on said shaft, a drive belt between said first sheave and said second sheave, a return spring operating on said axially moveable sheave, a roller fixed relative to said second sheave and a pivot pin fixed on and moveable with said first sheave; said device comprising:

an elongated body pivotally coupled to said pivot pin and having first and second opposed ends and with an arcuate outer edge camming surface in contact with said roller so as to provide a camming motion to move said elongated body laterally relative to said roller;

an aperture formed within said elongated body and disposed adjacent said first end thereof and constructed so as to mate with said pivot pin to allow said elongated body to pivot relative to said pivot pin for creation of said camming motion, the point of contact between said camming surface and said roller being determined by centrifugal forces operating on said elongated body and said pivot pin;

a closed hollow chamber formed within and positioned internally of said elongated body with said hollow chamber having a chamber axis extending between said first and second opposed ends; and weighting means within said chamber and freely moveable reciprocably therein in response to centrifugal force from rotation of said shaft, wherein the relative position of the weighting means defines a counterweight ramp axis and with a counterweight ramp angle being the angle defined between the counterweight ramp axis and the direction of the centrifugal force, whereby in use, the movement of the weighting means within said chamber, thereby transferring a force to said first sheave to axially move said first sheave into engagement with said belt and with said belt engaging said second sheave to transfer rotation from said first sheave to said second sheave.

15. The device of claim 14 wherein said engagement speed is in the range of 4000 rpm to 6000 rpm.

16. The device of claim 14 wherein said engagement speed is preferably greater than 5000 rpm.

17. The device of claim 14 wherein said generally spherical member has a mass in the range 2 grams to 4 grams.

18. A device for use in a centrifugal clutch assembly, said clutch assembly comprising a shaft which carries a first sheave axially moveable on said shaft, a second sheave axially fixed on said shaft, a drive belt between said first sheave and said second sheave, a return spring operating on said axially moveable sheave, a roller fixed relative to said first sheave and a pivot pin fixed on and moveable with said first sheave, said device comprising:

- an elongated body having an arcuate outer surface constructed so as to provide a cam surface relative to said roller;
- an aperture formed within said elongated body and disposed adjacent said first end thereof and constructed so as to mate with said pivot pin to allow said elongated body to pivot relative to said pivot pin;
- a closed hollow chamber formed within and positioned internally of said elongated body, with said hollow chamber extending laterally from said first end toward said second end;
- weighting means freely moveable within said chamber, said weighting means comprising at least one generally spherical member having a predetermined mass, wherein the relative position of the weighting means defines a counterweight ramp axis and with a counterweight ramp angle being the angle defined between the counterweight ramp axis and the direction of the centrifugal force, whereby in use, the movement of the weighting means within said chamber alters the effective mass on the counterweight ramp angle, thus altering overall effective weight of the weighting means, so as to optimize positioning of said weighting means relative to said centrifugal force to controllably alter the centrifugal force effecting said elongated body;
- adjustment means for adjusting a first orientation of said weighting means within said chamber when said device is in said rest position, wherein in use, said first sheave rotates at a variable speed, so as to generate a centrifugal force upon said device whereupon at a predetermined engagement speed in the range of 4000 rpm to 6000 rpm, said device pivots from a rest position to a full engagement position as said weighting means move within said chamber thereby transferring a force to said first sheave to axially move said first sheave into engagement with said drive belt to transfer rotation to said second sheave.

\* \* \* \* \*